(12) United States Patent
Biegelsen et al.

(10) Patent No.: US 7,148,605 B2
(45) Date of Patent: Dec. 12, 2006

(54) BIAXIAL PIEZOELECTRIC MOTOR

(75) Inventors: David K. Biegelsen, Portola Valley, CA (US); Lars-Erik Swartz, Sunnyvale, CA (US)

(73) Assignee: Palo Alto Research Center, Incorporated, Palo Alto, CA (US)

( * ) Notice: Subject to any disclaimer, the term of this patent is extended or adjusted under 35 U.S.C. 154(b) by 169 days.

(21) Appl. No.: 10/737,222

(22) Filed: Dec. 15, 2003

(65) Prior Publication Data

US 2005/0127787 A1   Jun. 16, 2005

(51) Int. Cl.
*H02N 2/00* (2006.01)
(52) U.S. Cl. ............... 310/323.16; 310/323.13; 310/323.14; 310/323.17; 310/328
(58) Field of Classification Search ............... 310/323.13–323.14, 323.16–323.17, 328
See application file for complete search history.

(56) References Cited

U.S. PATENT DOCUMENTS

| | | | | |
|---|---|---|---|---|
| 4,613,782 A | * | 9/1986 | Mori et al. ............ | 310/323.16 |
| 4,727,278 A | * | 2/1988 | Staufenberg et al. ...... | 310/328 |
| 4,950,135 A | * | 8/1990 | Tojo et al. ............... | 417/410.5 |
| 5,043,621 A | * | 8/1991 | Culp ..................... | 310/316.02 |
| 5,461,273 A | * | 10/1995 | Kawasaki et al. ..... | 310/316.02 |
| 5,598,051 A | * | 1/1997 | Frey ..................... | 310/334 |
| 6,064,140 A | * | 5/2000 | Zumeris ................ | 310/323.02 |
| 6,404,104 B1 | * | 6/2002 | Maeno et al. .......... | 310/323.02 |
| 6,431,908 B1 | * | 8/2002 | Beck et al. ............. | 439/500 |
| 6,448,694 B1 | * | 9/2002 | Matsuo et al. ......... | 310/328 |
| 6,661,154 B1 | * | 12/2003 | Shibatani .............. | 310/316.01 |
| 6,700,305 B1 | * | 3/2004 | Matsuda et al. ....... | 310/323.16 |
| 6,927,527 B1 | * | 8/2005 | Nakanishi ............. | 310/323.02 |
| 2002/0038988 A1 | * | 4/2002 | Matsuo et al. ......... | 310/323.16 |
| 2002/0057040 A1 | * | 5/2002 | Shibatani .............. | 310/323.16 |

\* cited by examiner

*Primary Examiner*—Thomas M. Dougherty

(57) ABSTRACT

A piezoelectric motor that allows movement of an arbitrary object in an arbitrary direction is described. The piezoelectric motor includes at least two piezoelectric drives positioned to direct energy at an angle to each other. A contact element translates the energy from the piezoelectric drives to an object, thereby moving the object in the desired direction.

5 Claims, 8 Drawing Sheets

FIG. 10
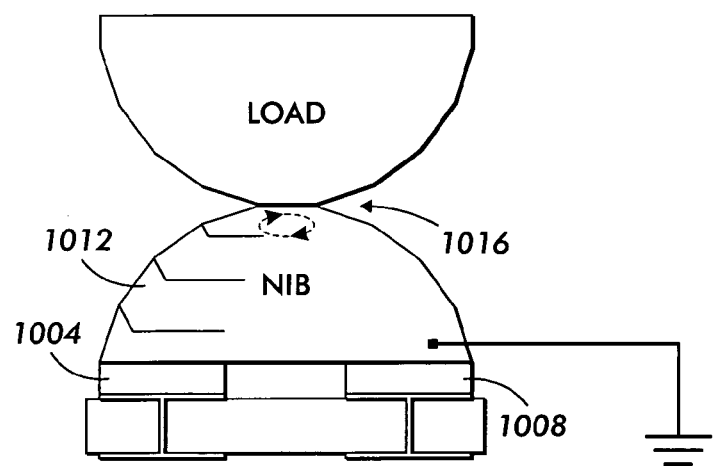
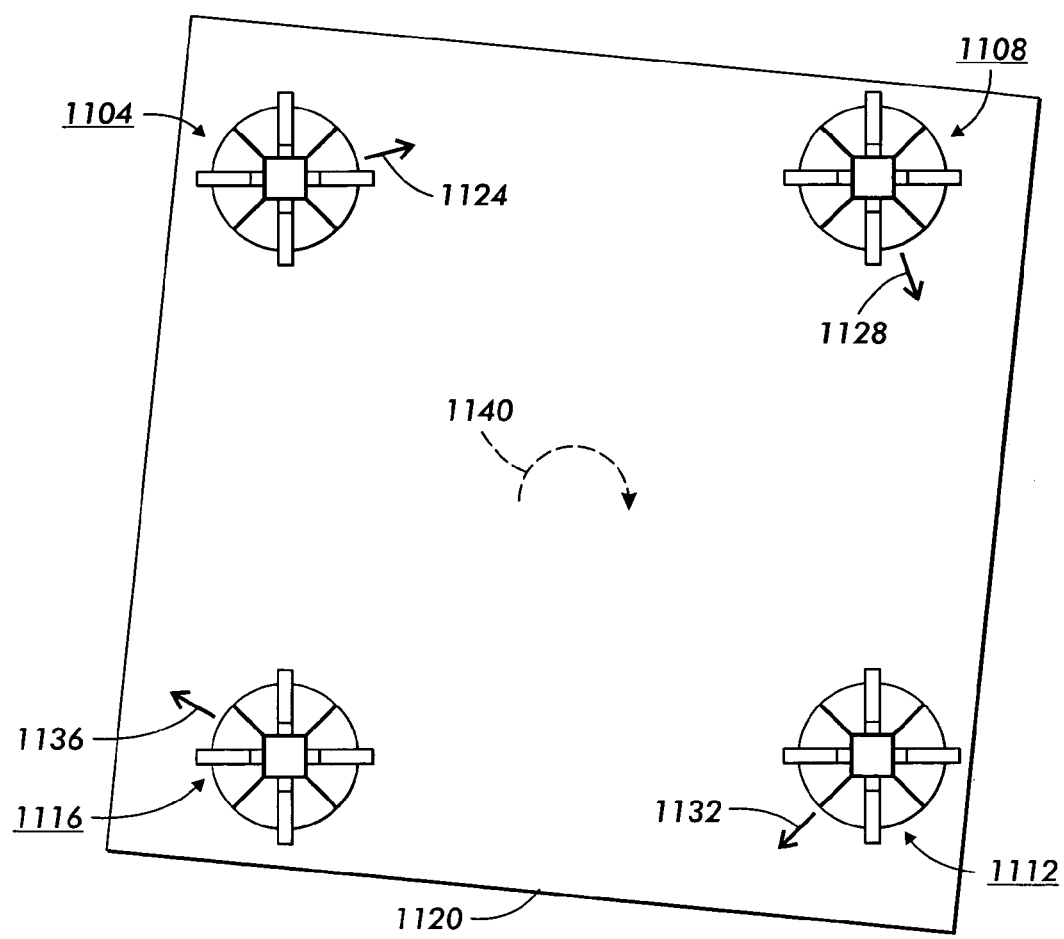
FIG. 11

BIAXIAL PIEZOELECTRIC MOTOR

BACKGROUND

Modern systems often use distributed actuation to move arbitrarily shaped objects along a desired path. Piezoelectrically driven translators provide one method of accomplishing such actuation. One example of a piezoelectric translator is the PAD 130, a piezoelectric micro-positioning motor manufactured by EDO Ceramics of New York, N.Y. Such translators enable compact, high precision object movement.

However, such translators are typically confined to linear motion. Additional translators placed at different positions and orientations provide additional degrees of movement. The additional translators add cost and complexity to the overall structure.

Thus a translator capable of moving objects of arbitrary shape along an arbitrary path are needed.

SUMMARY

A biaxial piezoelectric motor is described. A contact element in the biaxial piezoelectric motor includes at least one point to come in contact with an object to be moved. One side of the contact element couples to a first piezoelectric driver. When energized, the first piezoelectric driver moves the object in a first direction. A second piezoelectric driver couples to a second side of the contact element. When energized, the second piezoelectric driver moves the object in a second direction. In a plane, the first direction and the second direction intersect to form an angle other than 180 degrees thus enabling movement of the object in at least three directions in a two dimensional plane.

BRIEF DESCRIPTION OF THE DRAWINGS

FIG. 10 shows a side view of one embodiment of a contact element and piezoelectrics.

FIG. 11 shows using four biaxial motors to rotate an object.

DETAILED DESCRIPTION

Figure 1:
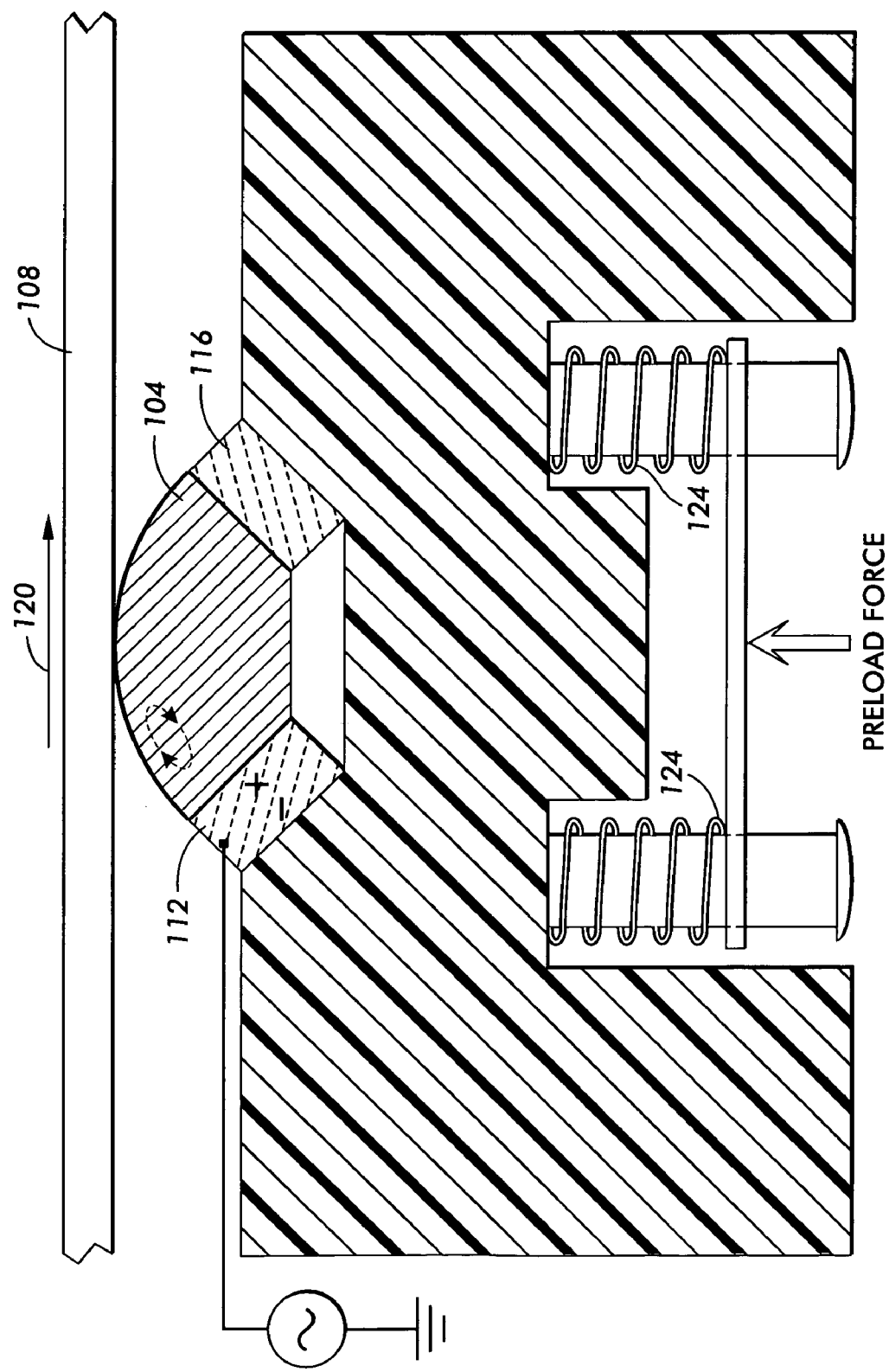
FIG. 1 shows a side view of a piezoelectrically driven motor.

An improved structure and apparatus for moving an arbitrary object along a predefined arbitrary path is described. FIG. 1 shows a side view of a piezoelectrically driven motor. In FIG. 1, a contact element 104 moves an object 108. As will be described in more detail below contact element 104 imparts motion to object 108 by inducing discrete steps. The size and frequency of the steps determines an object 108 surface motion speed. The step motion direction of contact element 104 determines the direction of object 108 surface motion.

Contact element 104 may be made of a number of substances. In one embodiment, contact element 104 is made of a metal such as aluminum and coated with a coating, such as a polymer layer. The coating enhances the frictional characteristics between contact element 104 and object 108 as well as toughening the surface of the contact element 104. The thickness of the coating should be significantly less than the length of motion of the contact element surface. A thickness of 0.01–1 microns is suitable. In one embodiment, a conductor (not shown) couples contact element 108 to an electrical ground. Grounding contact element 108 provides a common capacitive ground for piezoelectrics 112, 116 attached to contact element 108.

A plurality of piezoelectrics 112, 116 are coupled to various points of contact element 104. Piezoelectrics 112, 116 may be bulk piezo slabs or thick film elements of various sizes and shape. Piezoelectrics 112, 116 may be bonded to contact element 104, using, for example, a thin epoxy film, or may be cast on contact element 104 using, for example, a sol-gel process or by sputtering the piezoelectric onto the contact element. The piezoelectrics are selected to match desired characteristics, for example, thick piezoelectrics have lower resonant frequencies and larger vibrational amplitudes, thus providing larger steps but fewer steps per second. In applications where supply voltages are limited thinner piezoelectric layers can provide more steps per second using lower supply voltages. Where higher velocities are desired and voltages are not limited by power supplies, thinner piezoelectric layers can provide higher object velocities because thinner piezoelectrics can support higher breakdown fields than thicker piezoelectric elements.

In order to move object 108 in a direction of travel indicated by arrow 120, an electrical signal is applied to piezoelectric drive element 112. The electrical signal is typically a periodic waveform. The amplitude and phase of the waveform as well as the frequency may be adjusted and coordinated with the other piezoelectrics to achieve a desired lateral motion in a desired azimuthal orientation. Typical voltage amplitudes are between 10 and 1000 volts, and typical frequency ranges are between 10 KHz and 1000 KHz.

The applied periodic waveform includes both time periods of increasing voltage and time periods of decreasing voltage. Application of a voltage with the same sign as the poling field generally results in an expansion of the piezo thickness. During the expansion phase, the applied increasing voltage causes piezoelectric drive element 112 to expand. Expansion of piezoelectric drive element 112 pushes contact element 104 upwards and to the right along the direction of travel indicated by arrow 120. Springs 124 can be used to maintain a preload force keeping contact element 104 in contact with object 108. The expansion of piezoelectric drive element 112 exerts an additional upward push against the vertical reaction force that increases friction at the contact point between contact element 104 and object 108. The increased vertical force and relatively small lateral reaction force causes contact element 104 and object 108 to move to the right.

After expansion, the electrical signal is reversed or removed resulting in a contraction phase of the piezoelectric drive element 112. In the contraction phase, contact element 104 pulls downward thereby reducing the vertical force and the resultant friction between contact element 104 and object 108. The reduction in friction is accompanied by a movement of contact element 104 to the left without pulling object 108 along. This type of motion is often called 'stick-slip.' Thus during the piezoelectric expansion phase, contact element 104 frictionally pushes contacted object 104 along the direction of arrow 120, while during the second contraction phase, the contact element 104 releases object 108 and slips to the left. This stick-slip cycle is repeated multiple times resulting in an elliptical trajectory of the tip of contact element 104 and a net translation of the object along arrow 120. In one configuration produced by the ceramics division of EDO Corporation which can be found at www.edoceramic.com/PEMot.htm, a 130 KHz signal is applied to piezoelectric 112. Each cycle results in approximately an ~2.3 micron step of object 108. The combined frequency and step size results in a velocity of ~0.3 meters/second and application of 2.5 Newtons of lateral force to object 108. Driving piezo element 116 while piezo element 112 is idle drives object 108 to the left.

Figure 2:
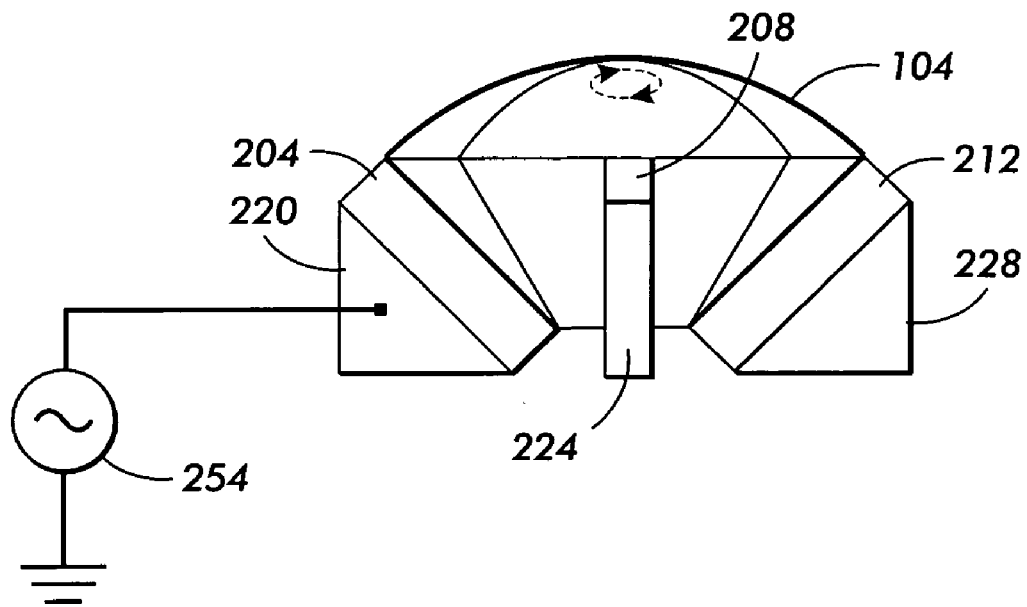
FIG. 2 shows a side view of one embodiment of a contact element.
Figure 3:
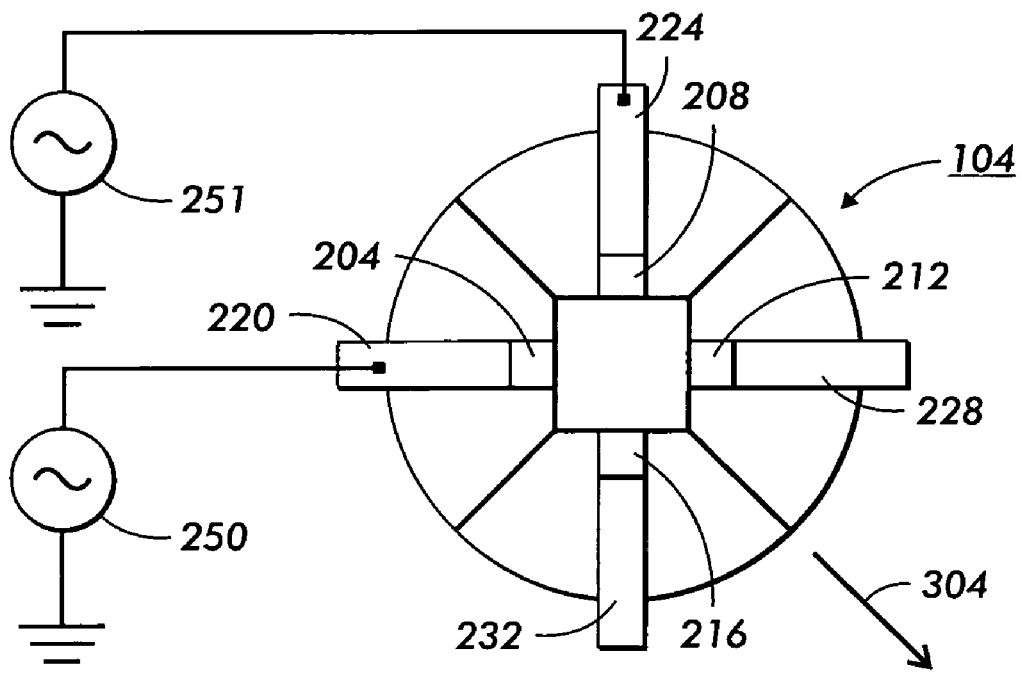
FIG. 3 shows a bottom view of one embodiment of a contact element.

FIG. 2 shows a side view and FIG. 3 shows a bottom view of one embodiment of contact element 104. FIG. 2 and FIG. 3 also show power source 250, 254 applying power to the contact element. The power sources are typically alternating current power sources.

In FIG. 2 and FIG. 3, contact element 104 is a hemispherical cap. Bonded to, or deposited onto facets in contact element 104 are four piezo electric elements 204, 208, 212, 216. In the illustrated embodiment, piezoelectric 204 is axially located with respect to piezoelectric 212; while piezoelectric 216 is axially located with respect to piezoelectric 208. As used herein, "axially located" means that the second element is mirrored about the center line of the contact element. Therefore, when a first piezoelectric is switched off and an axially located piezoelectric is switched on, the direction of movement of an object at a contact point changes to an opposite direction (180 degrees).

Four conducting, typically metallic, contact blocks 220, 224, 228, 232 are coupled to the four piezo electric elements 204, 208, 212, 216. Contact blocks 220, 224, 228, 232 enable application of an electrical signal to the piezo electric elements driving contact element 104. The surfaces of piezo elements can be metallized with a thin metal film before bonding.

FIG. 10 shows an alternate arrangement for a piezo electric contact element arrangement. In FIG. 10, piezo electrics 1004, 1008 are coupled to the approximately planar underside of a hemispherical contact 1012. At higher frequencies, where sound waves are considerably shorter than the radius of the hemisphere, the acoustic waves interact with contact 1012 to propagate and focus on contact point 1016. Using higher frequency acoustic waves in conjunction with a hemispherical or prismatic shaped contact 1012 element results in higher frequency smaller steps compared to the embodiments shown in FIG. 2 and FIG. 3. The net result is approximately the same amplitude of motion. Further focusing of sound waves toward the contact point increases the step size and velocity of the object to be moved. The planar structure of FIG. 10 also allows use of simpler and cheaper planar manufacturing technologies in the manufacture of piezo elements and contacts coupled to PCBs.

Figure 9A:
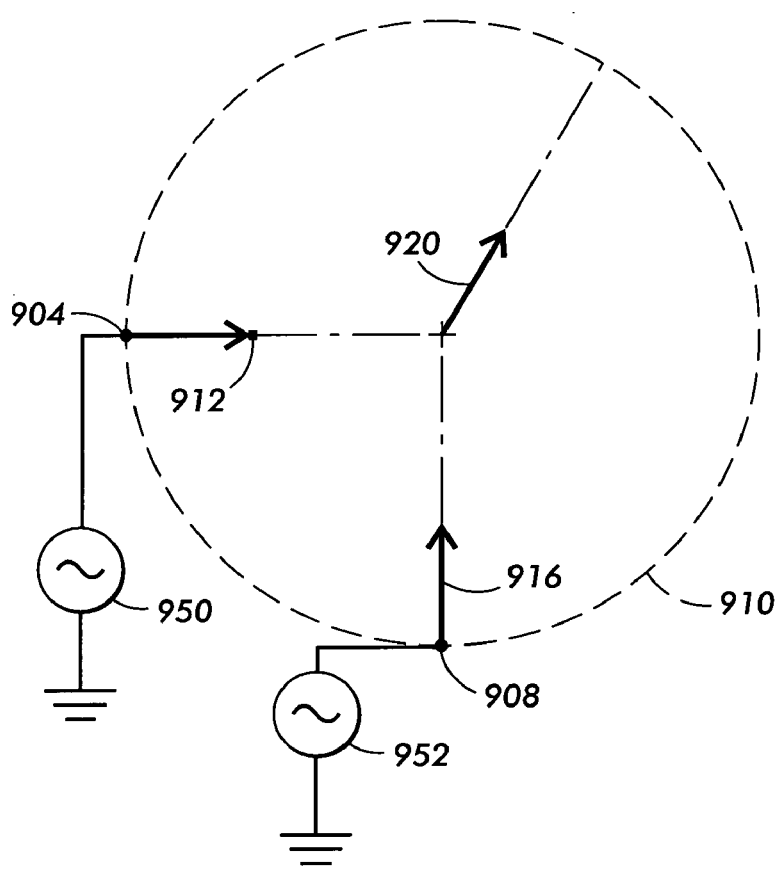
FIG. 9 shows a vector diagram used to compute the amount of energy to apply to each piezoelectric in a biaxial piezoelectric system.
Figure 9B:
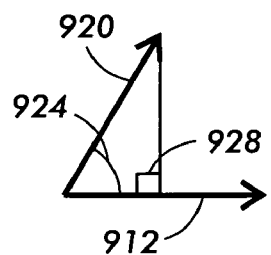
Figure 9C:
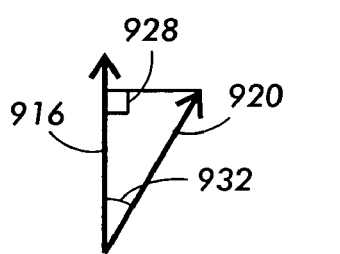

A driving circuit 250, 251 provides electrical waveforms with arbitrary phases and amplitudes to contact blocks to affect a desired lateral motion in any azimuthal orientation and with the desired amplitude. For example, if movement along a diagonal direction indicated by arrow 304 is desired, the movement may be accomplished by providing the same electrical waveform, either in phase or out of phase, to piezoelectric elements 204, 208. A more detailed explanation of energizing piezoelectrics will be provided in the discussion accompanying FIGS. 9A–9C.

Contact element 104 may be arbitrarily shaped. In one embodiment, contact element 104 has a curved bottom surface, such as a round cone shape. The curved bottom surface focuses acoustic fields toward the point of contact, or nip, and thereby amplifies the mechanical coupling between contact element 104 and object 108. Patterning the surface of contact element 104 also can be used to amplify the motion of contact element 104 at a contact point. For example, a surface made up of a forest of pillars may be used to mechanically amplify lateral motion by converting angular rotation of the pillars (induced by the contact motion) to leveraged pillar tip translation. The higher translation amplitude and velocity come at the expense of reduced force.

Figure 4:
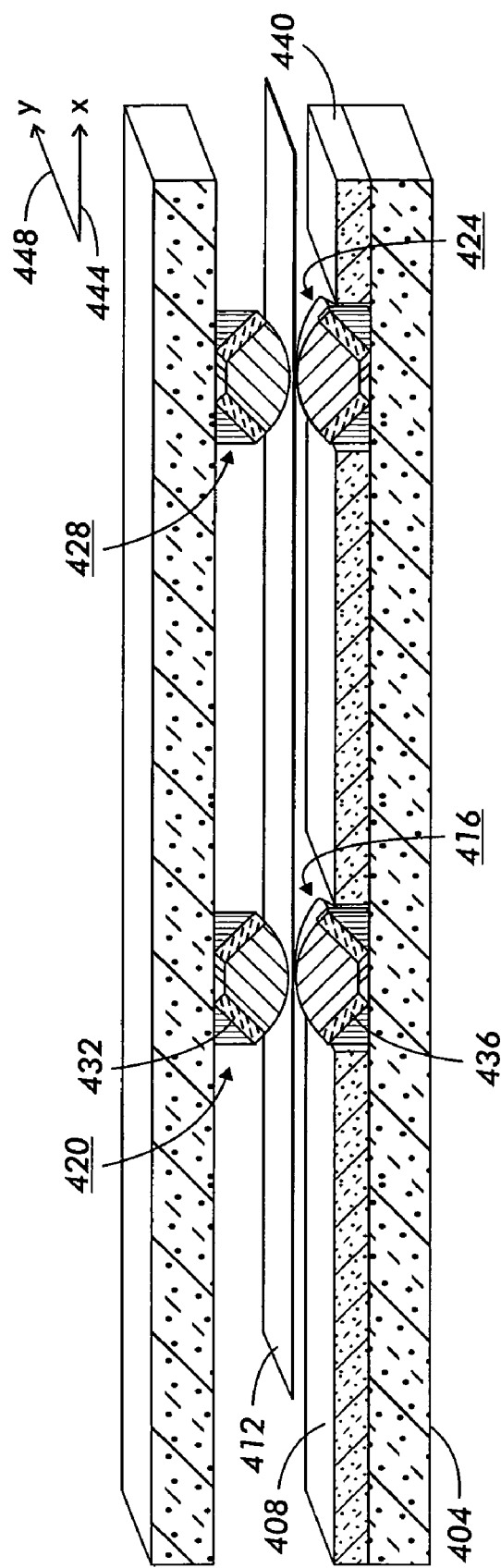
FIG. 4 shows a biaxial motor mounted to a PCB Board working and interacting with other biaxial motors to move an object.

FIG. 4 shows biaxial motors mounted to a Printed Circuit Board (PCB) 404. The PCB can be made of various materials such as fiber re-enforced epoxy, ceramics, and plastics. In some embodiment, conducting traces in the PCB electrically connect the electromechanical elements, mechanical supports, and positioners. Control and drive electronics 408 mounted on PCB 404 power the piezoelectric drivers. In the embodiment shown, an object 412 to be moved is placed between biaxial motors 416, 420, 424, 428. Synchronizing and simultaneously applying power to complimentarily placed piezoelectric drivers 432, 436 in complimentarily placed biaxial motors 416, 420 amplifies the movement of object 412.

In the illustrated embodiment, sensors, such as a large area sensor (LAST) 440, detects the position of the object. A typical large area sensor is described in U.S. Pat. No. 6,476,376, although other sensor technology may be used. Control electronics 408 control the application of voltages to each piezo-electric in each biaxial motor. In one embodiment, sensor 440 detects the position of object 412 in both the x direction 444 as well as the y direction 448, and transmits signals to non-axially located piezo-electric drivers to control movement of object 412 in the two dimensional space.

The magnitude and direction of object motion created by a biaxial motor depends on the number and size of stick-slip steps created by each of the piezo-driven modes. The velocity of the object may be represented by a vector that depends on the amplitude or the steps, the size of the steps and the frequency of the steps. Control electronics determine at what amplitude and what frequency to energize each piezoelectric of each piezomotor to direct movement of an arbitrary object in an arbitrary two dimensional plane. FIG. 9 shows a non-diametrically disposed placement of two piezoelectrics 904, 908 with respect to a contact element 912. Piezoelectric 904 powered by drive circuit 950 directs energy to move an object in direction 912 and piezoelectric 908 powered by drive circuit 952 directs energy to move an object in direction 916.

Arrow 920 shows a direction of desired movement. A processor computes the ratio of amplitude delivered to each piezoelectric to achieve the desired movement. One method of computation involves breaking the desired movement into components vectors. For example, in the illustrated embodiment, desired movement 920 forms an angle 924 with first direction 912. Thus if angle 928 is kept perpendicular, the amplitude delivered to piezoelectric 904 which directs force in direction 912 may be a unit of amplitude times the cosine of 924. Likewise, if angle 932 is the angle between second direction 916 and desired movement 924, then the amplitude delivered to piezoelectric 908 which generates a force in direction 916 may be the unit of amplitude times the cosine of 932. Controlling the ratio of amplitude delivered to the two piezoelectrics 904, 908 determines the trajectory of the object. Similarly, frequencies can be used. Thus, the ratio of the number of steps of fixed size can be directly related to the angle and the number of steps related to the vector magnitude.

Two methods of controlling object vector magnitude include (1) controlling the amplitude or magnitude of piezoelectric expansion and (2) adjusting the frequency of piezoelectric expansion. Voltage increases may be used to control amplitude. Alternately, increases in object vector magnitude may be accomplished by increasing the frequency of the electrical signal applied to the piezoelectric. For example, if twice the magnitude should be delivered to object along the direction controlled by piezoelectric 904 with respect to piezoelectric 908, then piezoelectric 904 may operate at twice the frequency of piezoelectric 908 while the step size applied by both piezoelectrics are kept constant.

While theoretically, two biaxial motors should be sufficient to move an object to any point in the plane, in practice, a pair of motors may not have enough power to move a heavy object the desired distance at the desired speed. Object size may also exceed the motor spacing needed to handle minimum sized objects. Thus more than two piezoelectric motors with their associated drivers may be used. Additional motive power may be obtained by providing a given biaxial motor with more than two piezos. In such systems, the total amount of work done can be distributed amongst the various piezoelectric elements acting in concert.

A single biaxial motor produces a vector that has an amplitude and a direction in the plane. Rotation of the object is unconstrained by one contact element. Thus to control the x, y and theta motion of the object (3 degrees of freedom) at least two biaxial motors are used.

FIG. 11 shows the use of four biaxial motors 1104, 1108, 112, 1116, each biaxial motor imparting a force to an object 1120. The force direction imparted by each biaxial motor is shown by corresponding actuation vectors 1124, 1128, 1132, 1136. The net resulting object motion is shown by an arrow 1140.

Figure 5:
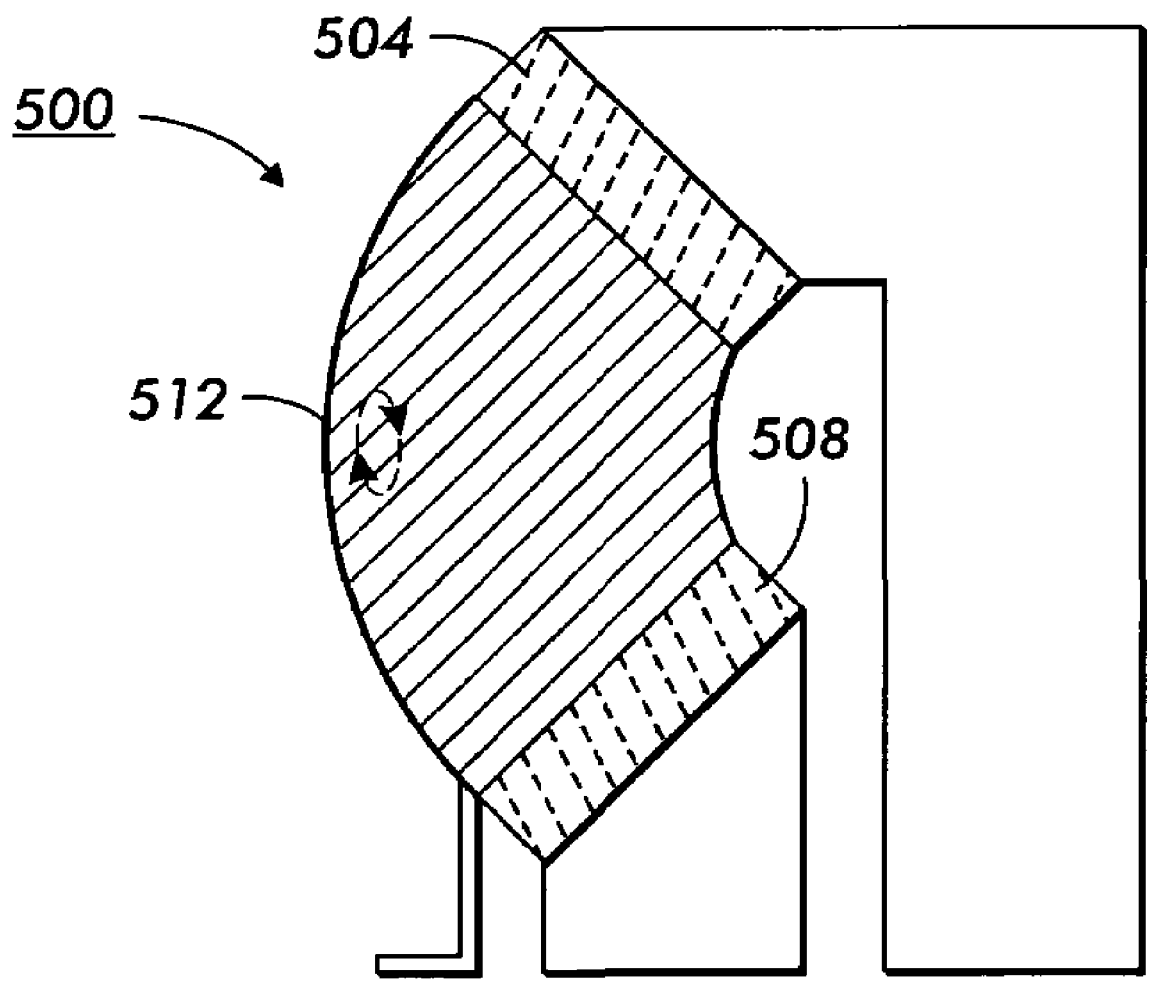
FIG. 5 shows a uniaxial piezoelectric driver element for use in a drive system such as an equatorial drive.
Figure 6:
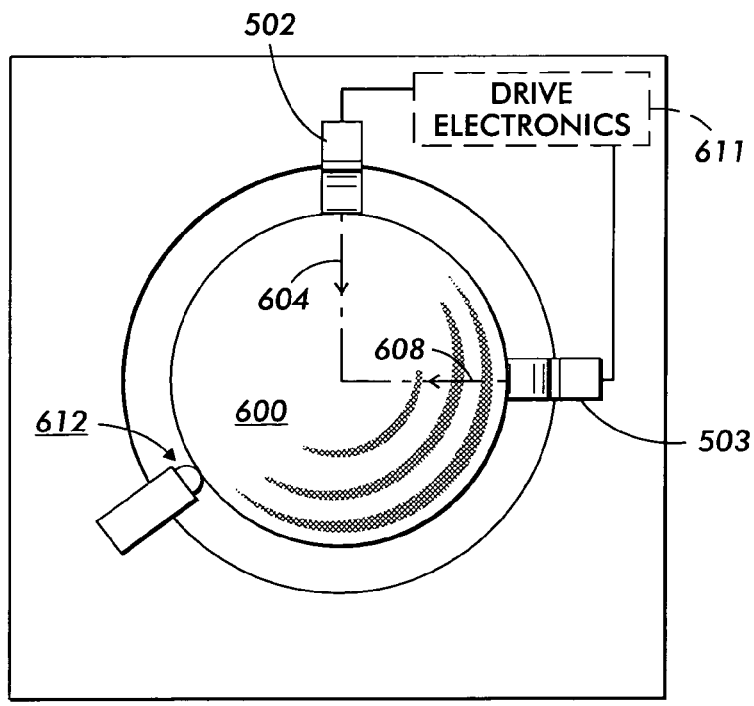
FIG. 6 shows a top view of one embodiment of an equatorial drive system that uses spherical balls to transfer motion to an object.
Figure 7:
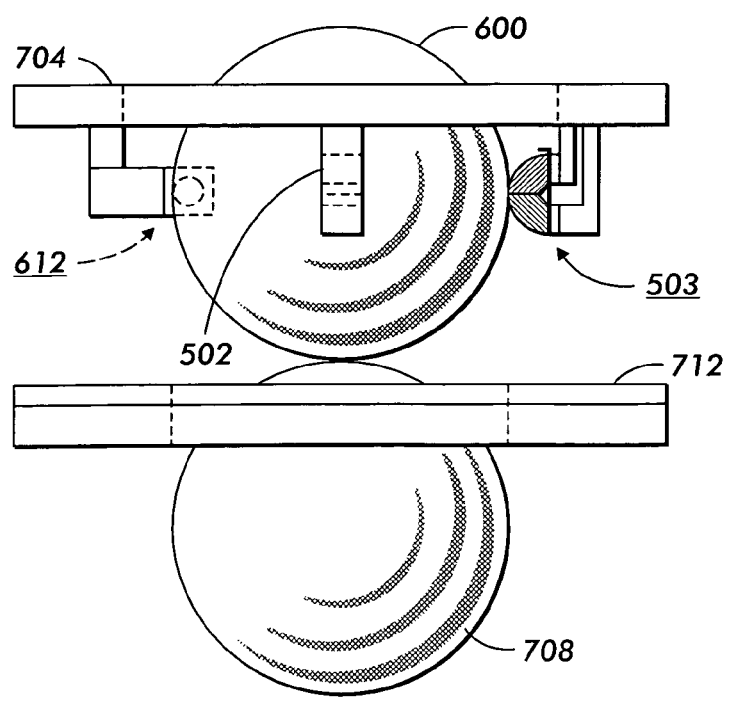
FIG. 7 shows a side view of the equatorial drive system of FIG. 6.

FIGS. 5–7 show an alternate embodiment of a biaxial motor. In FIG. 5, a vertically oriented orthogonally situated uniaxial piezoelectric driver element 500 includes piezoelectrics 504, 508 coupled to rotary contact transfer element 512. When mounted in the illustrated orientation, energizing first piezoelectric 504 would typically expand piezoelectric 504 thereby moving or rotating downward a surface that contacts contract transfer element 512. Energizing second piezoelectric 508 moves or rotates the surface in contact with contact transfer element 512 in an opposite direction. Thus piezoelectric 504 and piezoelectric 508 are axially located to form a uniaxial piezoelectric driver. Coupling a plurality of the illustrated uniaxial piezoelectric drivers to a plurality of non-diametrically disposed points on a hemispherical rotary contact element forms a biaxial motor capable of moving an object along an arbitrary path. FIG. 6 shows a top view and FIG. 7 shows a side view of the piezoelectric driver elements 500 incorporated into an equatorial drive system.

In the embodiment shown in FIG. 6 and FIG. 7, each uniaxial piezoelectric driver element 502, 503 has its contact element, such as contact element 512 of FIG. 5, coupled to a spherical transfer element 600. As used herein, contact elements are elements that directly transfer energy from the piezoelectrics to something to be moved. The "something to be moved" may be the final object or an intermediate transfer element such as transfer element 600. The combination of contact elements and transfer elements may be called a delivery mechanism to deliver the energy from the piezoelectrics to the object to be moved. The piezoelectric driver contact elements roll transfer element 600 to move an object across a two dimensional plane. When activated, driver element 502 rolls transfer element 600 in a direction indicated by arrow 604. When piezoelectrics in driver element 503 are activated, driver element 503 rolls contact transfer element 600 in a direction indicated by arrow 608. Note that arrow 604 and arrow 608 are oriented such that an intersection between the lines forms an angle, that angle between 0 and 180 degrees. Thus driver element 502 is non-diametrically disposed with respect to driver element 503. By avoiding angles of 0 and 180 degrees, and typically by favoring intersection angles between 45 degrees and 135 degrees, an object in contact with spherical transfer element 600 can be repositioned to any point in a plane.

In the illustrated embodiment, transfer element 600 is a spherical shell or ball. A small spring-loaded ball bearing 612 or other passive device holds transfer element 600 in place while still allowing transfer element 600 to roll or otherwise deform and transfer motion to an object. In an alternate embodiment, ball bearing 612 may be replaced by a third piezoelectric driver element.

FIG. 7 shows a side view of one embodiment of an equatorial drive. FIG. 7 shows a support structure 704, typically a PCB board, supporting first contact element 600 and piezoelectric driver elements 502, 503. As previously described, AC excitation of piezoelectric elements in the piezo-drivers rotates transfer element 600 in a desired direction.

In FIG. 7, transfer element 600 presses against an opposite rotating structure 708. The pressure between transfer element 600 and rotating structure 708 creates sufficient friction to prevent slippage between transfer element 600 and an object inserted between transfer element 600 and rotating structure 708. Avoiding slippage assures that the rolling of transfer element 600 translates into precise lateral movement of the object. Detector 712 tracks object motion and control circuitry uses detector 712 output to adjust amplitude and/or frequency to piezoelectric drivers 502, 503. Rotating element 708 can be replaced by another biaxial piezomotor driven in a manner so that the motion of its contact transfer element mirrors the motion of transfer element 600.

Figure 8:
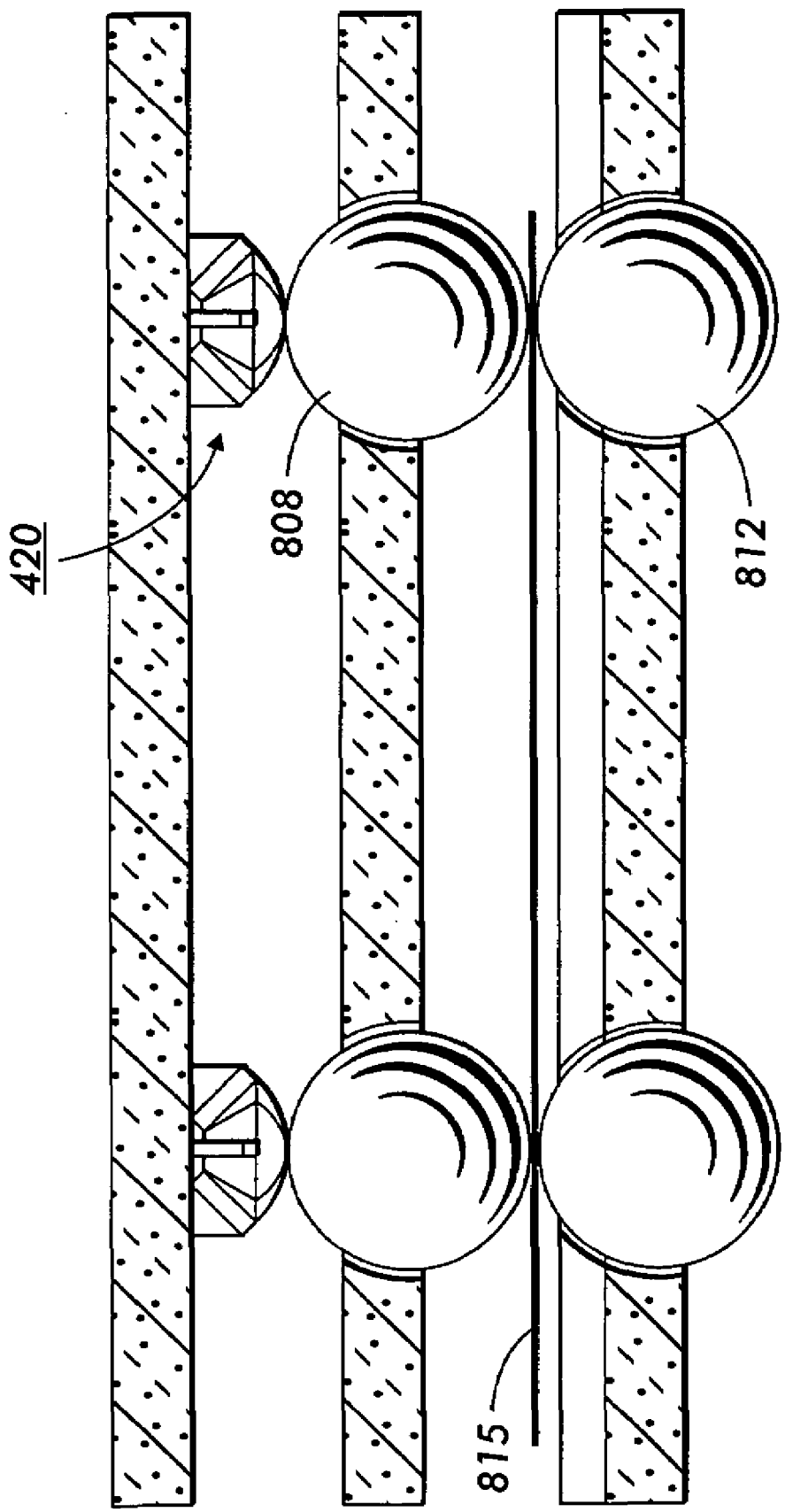
FIG. 8 shows an equatorial drive system that uses a single biaxial piezoelectric motor to move an object.

FIG. 8 shows an alternate embodiment of using intermediate transfer elements such as ball 808 to transfer energy from a contact element to the object to be moved. The ball 808 or spherical shell translates the stick-slip motions of the piezoelectric driver's contact element to pure rotational motions. In situations where the object's compliance exceeds the stroke of the piezo-driven contact element, the final object 815 does not move. The hard surface of the intermediate ball, however, is optimized for the stick-slip transduction of motion and in turn provides a rolling contact to object 815. Even though ball 808 indents into object 815 surface, rolling is unimpeded and the object is moved by the biaxial motor. FIG. 8 shows using the piezo-electric driver of FIG. 2 and FIG. 3 to move the intermediate contact transfer element. An opposite pressure applying structure such as rolling structure 812 maintains pressure between an object and intermediate contact element 808.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A biaxial piezoelectric motor comprising:
  a contact element, the contact element to include at least one point to contact an object to be moved;
  a first piezoelectric driver coupled to one side of the contact element, when energized, the first piezoelectric driver to move the object in a first direction approximately tangential to the surface of the contact element at the at least one point of contact; and,
  a second piezoelectric driver coupled to a second side of the contact element, the piezoelectric to move the object in a second direction approximately tangential to the surface of the contact element at the at least one point of contact, the first direction and the second direction to form an angle other than 180 degrees to enable movement of the object in a two dimensional plane
  drive circuitry coupled to the first piezoelectric driver and the second piezoelectric driver, the drive circuitry to determine a desired direction and amplitude of motion for the object wherein the amplitude of motion for the object is controlled by adjusting the frequency of the first piezoelectric with respect to the frequency of the second piezoelectric, a higher frequency representing an increase in amplitude of motion for the object, the drive circuitry including a processor that computes the voltage amplitude applied to the first piezoelectric and the voltage amplitude applied to the second piezoelectric to move the object in the desired direction.

2. A biaxial piezoelectric motor comprising:
  a contact element, the contact element to include at least one point to contact an object to be moved;
  a first piezoelectric driver coupled to one side of the contact element, when energized, the first piezoelectric driver to move the object in a first direction approximately tangential to the surface the contact element at the at least one point of contact; and,
  a second piezoelectric driver coupled to a side of the contact element, the piezoelectric to move the object in a second direction approximately tangential to the surface of the contact element at the at least one point of the contact, the first direction and the second direction to form an angle other than 180 degrees to enable movement of the object in a two dimensional plane;
  drive circuitry coupled to the first piezoelectric driver end the second piezoelectric driver, the drive circuitry to determine a desired direction and amplitude of motion for the object, the drive circuitry Including a processor that computes the voltage amplitude applied to the first piezoelectric and the voltage amplitude applied to the second piezoelectric wherein the ratio of voltage amplitude applied to the first piezoelectric driver to the voltage amplitude applied to the second piezoelectric driver is equal to the ratio of the cosine of the angle formed between the desired direction and the first direction and the cosine of the angle between the desired direction and the second direction to move the object in the desired direction and wherein the ratio of amplitude of the motion for the object is a ratio of frequency applied to the first piezoelectric driver to the frequency applied to the second piezoelectric driver.

3. A biaxial piezoelectric motor comprising:
  a contact element, the contact element to include at least one point to contact an object to be moved, wherein the contact element interacts with an opposite surface to increase friction on the object to be moved and wherein the opposite surface is a ball bearing;
  a first piezoelectric diver coupled to one side of the contact element, when energized, the first piezoelectric driver to move the object in a first direction approximately tangential to the surface of the contact element at the at least one point of contact; and,
  a second piezoelectric driver coupled to a second side of the contact element, the piezoelectric move the object in a second direction approximately tangential to the surface of the contact element at the at least one point of contact, the first direction and the second direction to form an angle other than 180 degrees to enable movement of the object in a two dimensional plane.

4. A biaxial piezoelectric motor comprising:
  a transfer element;
  a first contact element driven by a first piezoelectric, the contact element coupled to a first point on the transfer element to move the transfer element in a first direction;
  a second contact element driven by a second piezoelectric, the second contact coupled to a second point on the transfer element to move the transfer element in a second direction; and,
  the transfer element including a surface to couple to an object to be moved, the transfer element to move the object in at least three degrees of freedom in a plane approximately tangential to the surface of the transfer element where the transfer element contacts the object to be moved.

5. The biaxial piezoelectric motor of claim 4 wherein the transfer element is spherical.

* * * * *